(12) United States Patent
Itskov et al.

(10) Patent No.: US 7,653,937 B2
(45) Date of Patent: Jan. 26, 2010

(54) VIDEO GAME TERMINAL AND SECURITY ACTIVATION ARRANGEMENT

(75) Inventors: Boris Itskov, Thornhill (CA); Efim Podvoiski, Richmond Hill (CA)

(73) Assignee: JVL Corporation, Concord, ON (CA)

( * ) Notice: Subject to any disclaimer, the term of this patent is extended or adjusted under 35 U.S.C. 154(b) by 759 days.

(21) Appl. No.: 11/182,815

(22) Filed: Jul. 18, 2005

(65) Prior Publication Data

US 2006/0079334 A1 Apr. 13, 2006

(51) Int. Cl.
*G06F 7/04* (2006.01)
*H04K 1/00* (2006.01)
(52) U.S. Cl. .......................................... 726/9; 380/251
(58) Field of Classification Search ................... 380/251
See application file for complete search history.

(56) References Cited

U.S. PATENT DOCUMENTS 7,032,240 B1 * 4/2006 Cronce et al. .................. 726/2

2004/0266533 A1 * 12/2004 Gentles et al. ................ 463/42

* cited by examiner

*Primary Examiner*—Brandon S Hoffman

(57) ABSTRACT

An arrangement for effective updating of video game terminals uses a security key device which is capable of operating next major generation software that at the time of sale or distribution of the security device is not available. Once this software is available, the security key with this forward compatibility to the next major generation of software, allows the owner to update any terminal having the security device. Therefore, existing product, both terminals and/or software upgrades can be sold with the capability for the purchaser to upgrade without return of the security key device. Software can be made generally freely available as it requires a security key device to function. This system is convenient and effective, and allows continued sale of product up to the release of the next major generation of software. The purchaser is buying a next generation key and as such, is buying product that is not about to be replaced.

7 Claims, 2 Drawing Sheets

VIDEO GAME TERMINAL AND SECURITY ACTIVATION ARRANGEMENT

FIELD OF THE INVENTION

Video game terminals include game operating software that requires a security key for the activation of the game software. The present invention is directed to an improved system for the control of software relative to an expected release of a major revision.

BACKGROUND OF THE INVENTION

Video game terminals and certain other computer devices have used a security key device, such as a Dallas chip, to control the activation of the software. The software is not operative without the particular security key. It is noted that these security keys are small devices which are inserted onto a PC board or into a receiving device associated with the game terminal. The game terminal cannot function without this particular device and appropriate software.

Video game terminal manufacturers continue to improve and update their game software and often introduce for sale, new generation software at predetermined times, such as the Fall, of each year. This new generation software is typically compatible with older video game terminals and these terminals can be updated by purchasing the software and the associated security key device. The security key device must be installed in the video game terminal to operate the new software. This new security device may also allow the operator to run earlier game software within the current generation of software if he finds it preferable. Thus the security activation key device is typically compatible within at least the current generation software. For example, each generation of software is often given a number, such as 6.0, whereas the next generation of software would be 7.0. Minor updates of the software could be 6.1, 6.2 or 6.3, for example. A security sold with any software with a generation, such as generation 6, is effective for software within that generation. It is not effective for generation 7.0 (i.e. the next generation).

Purchasers may be reluctant to either purchase a new video game terminal, with the present software or to purchase new software for updating their existing video game terminal if the next major generation software will soon be available. To overcome this delay in potential sales, manufacturers often allow a purchaser to update free of charge, any video game terminals sold within a certain period, prior to the release of the new generation software. In this way, the purchaser has the right to effectively update his terminal, free of charge.

Unfortunately, the process for updating is somewhat awkward, difficult and costly. The main issue concerns the security key device. This device must be removed from the terminal and returned to the manufacturer. The manufacturer then sends a new security key device to the purchaser who then installs it in the video game terminal. Typically, the new game software is also sent on a CD or could be downloaded from the INTERNET. With this arrangement, the manufacturer has the original security key returned and has provided a new security key to the recent purchaser, and thus the purchaser can operate the new software. With this arrangement there is excellent control of the security key devices which is important as the returned security key device could have been used for updating an older video game terminal if it was not returned to the manufacturer.

The above arrangement provides effective control of the security devices and allows updating of video game terminals recently sold prior to the release of new operating software. Undesirably, there is a significant cost to administer the system, and there are problems associated with time delays necessary to return the old security key and then provide the new security key.

The present invention seeks to overcome the above problems.

SUMMARY OF THE INVENTION

A method of updating a video game terminal according to the present invention comprises the steps of initially providing said video game terminal with operating software of a specified generation and requiring an appropriate security key device for operation thereof, providing said video game terminal with an appropriate security key device necessary for installing and/or operating said video game terminal using said specified generation operating software and capable of operating with the next major generation operating software not currently available, subsequently providing said next major generation operating software once available and thereafter installing said next major generation operating software on the video game terminal using said security key device.

According to an aspect of the invention the specified generation operating software and said next major generation operating software are freely available.

According to an aspect of the invention the security device is only available for a short transitional time period in advance of an anticipated introduction of the next major generation operating software.

A method of selling operating software for video game terminals according to the present invention comprises a normal sale of operating software of a known current generation in combination with a security key suitable for operating said known current generation of operating system, a transitional sale of operating software of said known generation in combination with a security key suitable for use with said known current generation of operating software and the next major generation of operating software not currently available, providing access to the next major generation of software as soon as it is available for use with the security key of any transitional sales, and thereafter selling operating software of the next major generation in combination with a security key for operating said next major generation software.

According to an aspect of the invention transitional sales are limited to a short time period of less than 6 months.

According to a further aspect of the invention transitional sales are limited to a period of 4 months or less.

In a preferred aspect of the invention the method includes using said provided access to the next major generation software to update a video game terminal by obtaining said next major generation software and using said security key associated with a transitional sale to allow a terminal to use said next major generation software.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
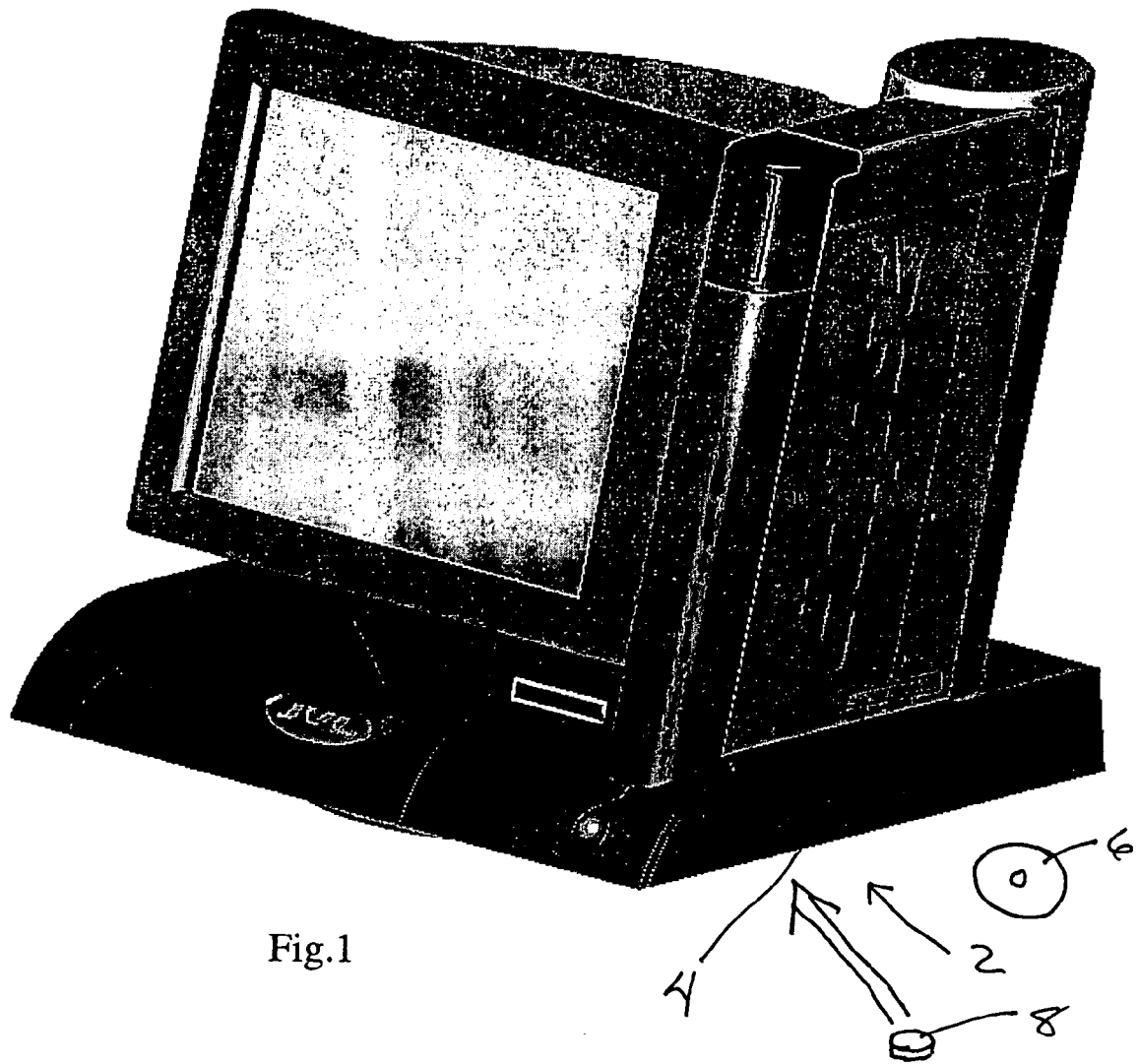
FIG. 1 shows a schematic of a game terminal.

A video game terminal 2 is shown in FIG. 1 having a CD drive 4 for receiving game software provided on a CD 6. The video game terminal 2 also includes a DALLAS security key 8 which is required to be inserted in the video game terminal for operating of the game software provided on the CD 6. The DALLAS security key 8 effectively provides control on what video game terminals can operate the game software 6 provided on the CD. The DALLAS security key or other suitable security key is basically a small device which is electrically connected to the video game terminal and includes security steps necessary for operating of the game software provided on the CD 6. Often further country specific or region specific instructions are provided as part of the security device. This provides the terminal with information regarding what portions of the game software on CD 6 needs to be downloaded.

Figure 2:
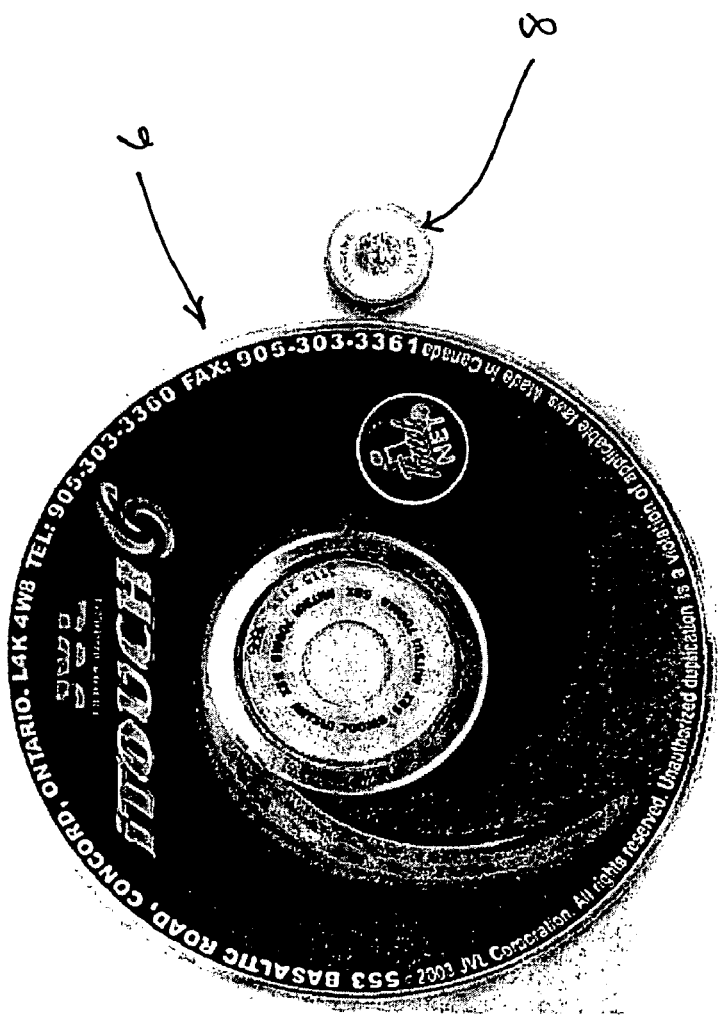
FIG. 2 shows game software and a security key device.

FIG. 2 shows the CD 6 and the security key device 8. These are often sold in combination but the critical component is the security key device 8.

Figure 3:
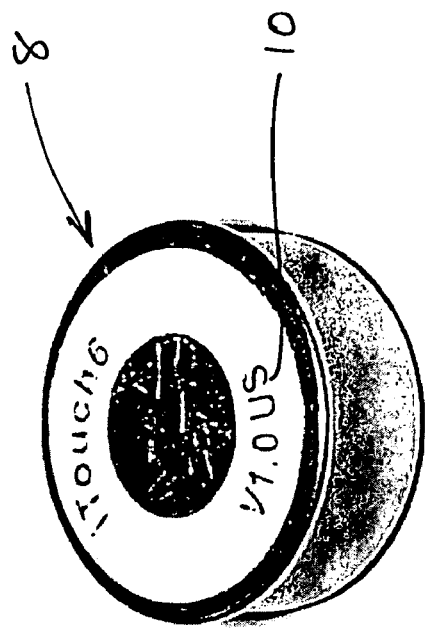
FIG. 3 shows the security key device.

FIG. 3 shows additional details of the security key device 8 in this case for programming a US terminal as identified by number 10 the country designation "US".

Video game software is essentially freely provided either on CDs or is downloadable from the INTERNET. The security key 8 is designed to operate the operating software provided with the terminal. For example, often new generation software is introduced yearly and the security key 8 will operate the most recent game software as well as any updates within the generation. For example, if the new generation software is identified as 4.0, the DALLAS chip 8 will operate the game software 4.0 as well as updates that may be necessary such as 4.1 or 4.2. Often the software is improved to fix certain problems and/or to introduce other games. This improved software may be available free of charge within the upcoming year. Typically, the security key 8 will be effective in operating the current generation of the software and any improvements thereto. The security key does not operate future major generation software where a charge for the improved software is required.

The anticipated release of a new generation of the game software such as 5.0 in the example above, poses problems as the manufacturer needs to control the security keys 8. This security key is designed to update earlier terminals and as such, it is necessary for the purchaser to return the key to the manufacturer before receiving the new key which will operate the software generation 5.0. The existing key is of value in its ability to update even earlier software and therefore, the return of the key is required.

To overcome the above problems, a different arrangement is proposed. The video game terminals 2 are sold with the present generation software and with an installed security key 8. The installed security key 8 is capable of running the present generation software provided with the machine as well as the soon to be released next major generation software. Therefore, the security key 8 will be sold with the video game terminal 2 such that it can operate the present generation software as well as the next major generation of this software, even though this next major generation may still be in the development stages.

In this way, video game terminals sold within two or three months of the release of the next major generation software are sold with security keys, capable of operating the present generation software as well as the next major generation software. The purchaser can request a copy of the next major generation software once it is released or download this software from the manufacturer. Insertion of the new software in the device with the key 8 sold with the device remaining unchanged, will allow the terminal to be updated. In this way, there is no requirement to return the security key 8 to the manufacturer or even replace the key, and the purchaser can exercise his right to update the machine, merely by inserting the next major generation software.

With the above arrangement, there is no requirement to return the security key and there is no requirement by the manufacturer to have a procedure for monitoring the updating process. With this system, there is no risk that the prior security key could be used for updating other video game terminals, as it is still needed in the original terminal.

Basically, the modified security key 8 is capable of allowing the video game terminal to operate with the existing current game software and preferably any earlier versions of this software, and additionally, to allow the video game terminal to operate with the next major generation software which is anticipated to be released in the near future. In this way, the security key is both backward compatible with earlier generations of software and forward compatible with the next major generation software. With this arrangement, the manufacturer defines the requirements of the security key for the next major generation of the software before release of the software and provides the key with the sale of game terminal with the present software.

This arrangement has been described with respect to the sale of video game terminals and the problem associated with updating of the software used by these video game terminals when an anticipated new generation software is about to be released but not yet available. Although this system is particularly advantageous for this situation, it is also valuable for the sale of the software and the security key for updating of existing terminals. As can be appreciated, an owner of several video game terminals who is considering updating the software is not motivated to complete this step if an anticipated next major generation of software will soon be available. However, the existing software can be sold with the next major generation key. The purchaser can review the next major generation software when it becomes available and update any terminals having the next major generation key. As previously described, the manufacturer controls keys and can make the software freely available. In this way, a purchaser is purchasing the next major generation key and can update the software at whenever he determines it desirable.

The present invention basically recognizes that the next major generation keys can be provided with existing terminals and with existing software, whereby both the terminals and the replacement software include as part thereof, the ability to update to the next generation, without the return of the security key. This provides an effective solution for both the purchasers and the manufacturers.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for updating of a video game terminal
    to operate with operating software of a specified generation and requiring an installed security key hardware device connected electronically with video game terminal for operation thereof,
    said method comprising
    providing said video game terminal with a security key hardware device necessary for operation of said video game terminal, said security key including a dual capability allowing installation and/or operation of said video game terminal with a specified generation operating software currently available and allowing installation and/or operation with a next major generation operating software not currently available, subsequently providing said next major generation operating software once available and thereafter installing said next major generation operating software on the video game terminal using said security key hardware device.

2. A method as claimed in claim 1 wherein said specified generation operating software and said next major generation operating software are freely available.

3. A method as claimed in claim 1 wherein said security key hardware device is only available for a short time period in advance of an anticipated introduction of the next major generation operating software.

4. A method of selling operating software for video game terminals where each terminal requires the installation of a security key hardware device for operation thereof; said method comprising a normal sale of operating software of a known current generation in combination with a security key hardware device suitable for operating said known current generation of operating system, a transitional sale of operating software of said known generation in combination with a security key hardware device having a dual capability for operating with both said known current generation of operating software and the next major generation of operating software not currently available, providing access to the next major generation of software as soon as it is available for use with the security key hardware device of any transitional sales, and thereafter selling operating software of the next major generation in combination with a security key hardware device for operating said next major generation software.

5. A method as claimed in claim 4 wherein said transitional sales are limited to a short time period of less than 6 months.

6. A method as claimed in claim 5 wherein said transitional sales are limited to a period of 4 months or less.

7. A method as claimed in claim 4 including using said provided access to the next major generation software to update a video game terminal by obtaining said next major generation software and using said security key hardware device associated with a transitional sale to allow a terminal to use said next major generation software.

* * * * *